June 15, 1965 R. G. DAY 3,189,201
BAFFLE STRUCTURE
Filed June 17, 1963 10 Sheets-Sheet 1

INVENTOR
ROBERT GEORGE DAY
By Cushman, Darby & Cushman
ATTORNEYS

June 15, 1965  R. G. DAY  3,189,201
BAFFLE STRUCTURE
Filed June 17, 1963  10 Sheets-Sheet 2
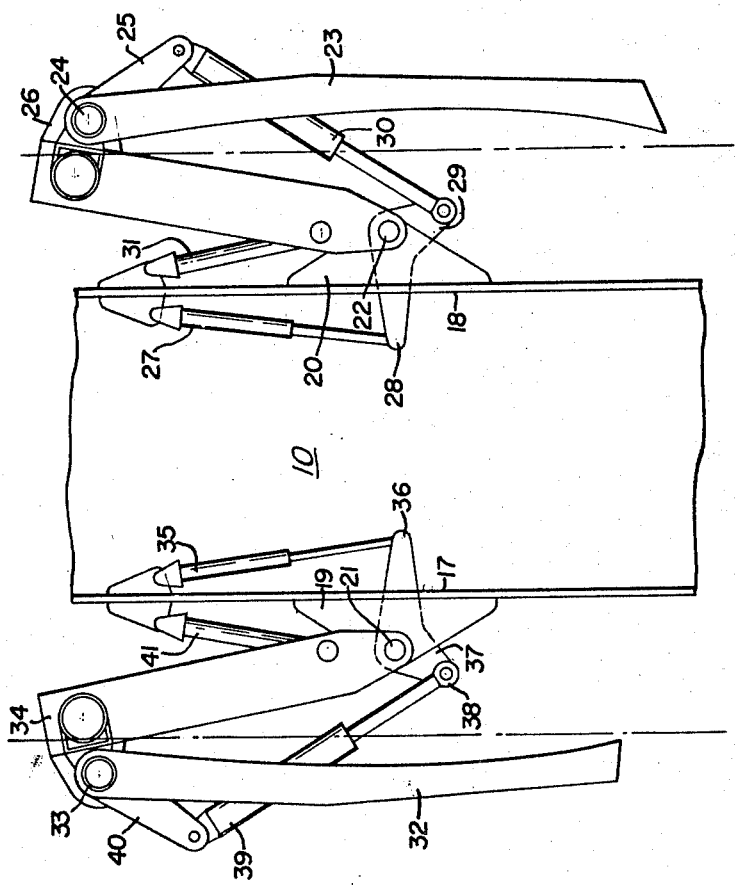
INVENTOR
ROBERT GEORGE DAY
By Cushman, Darby & Cushman
ATTORNEYS

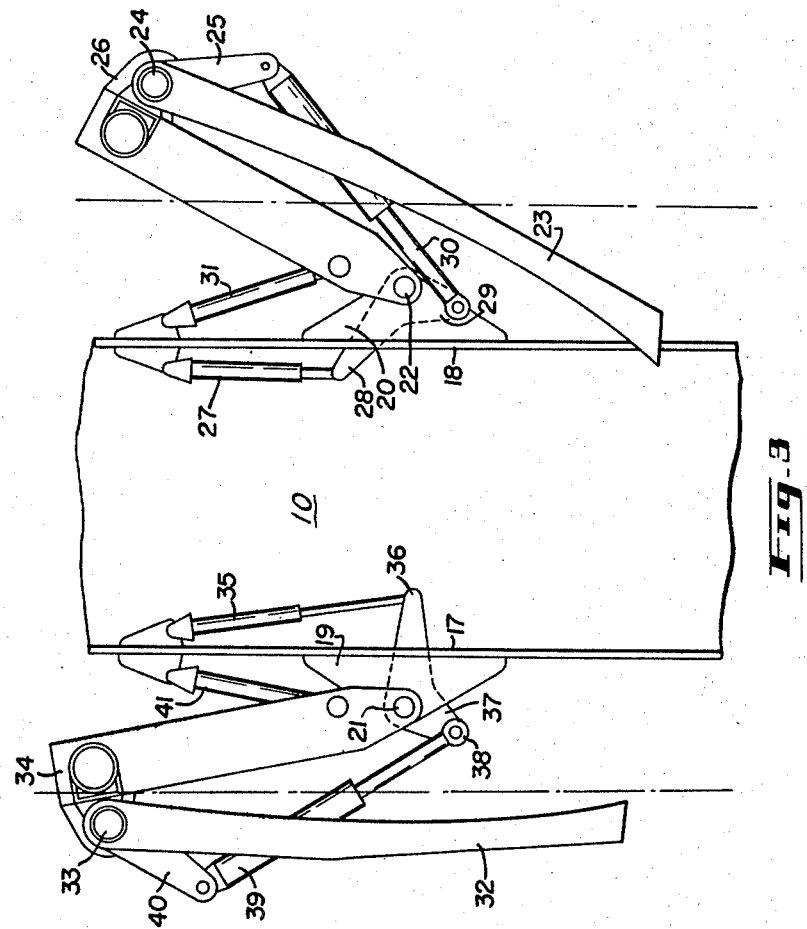

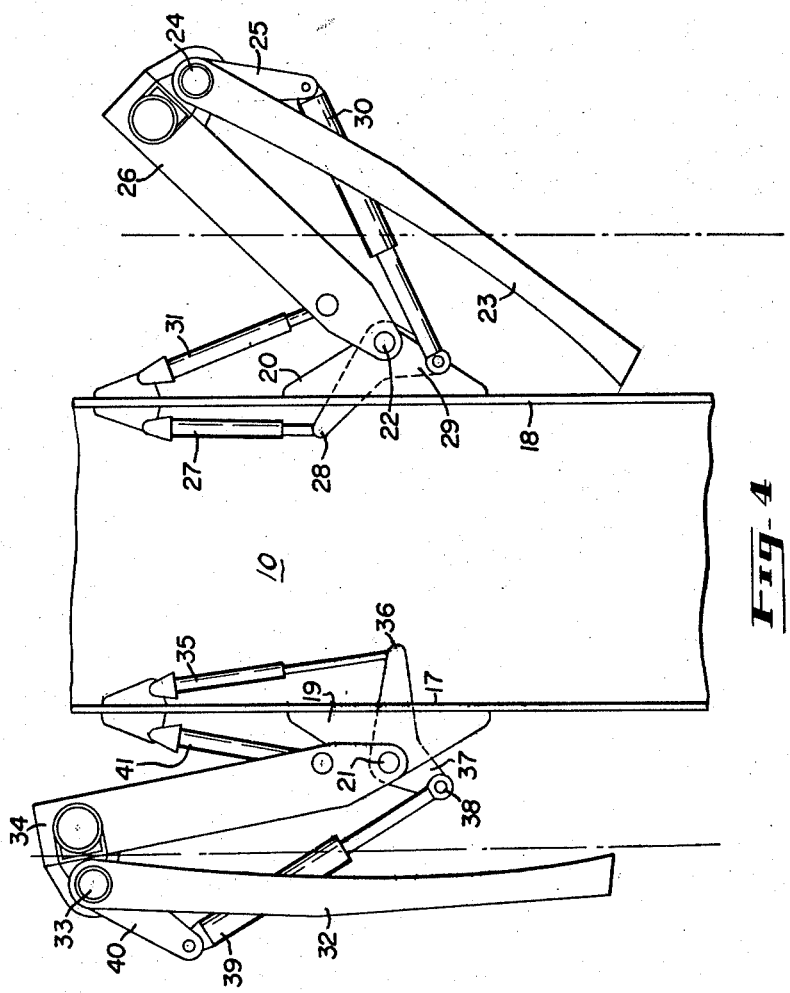

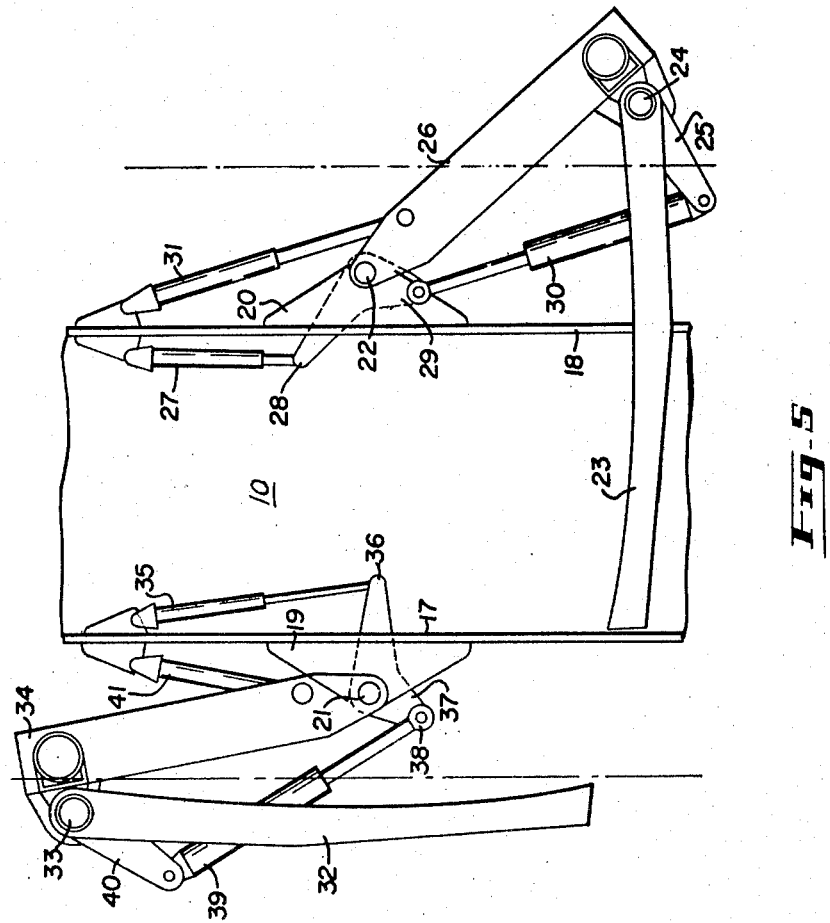

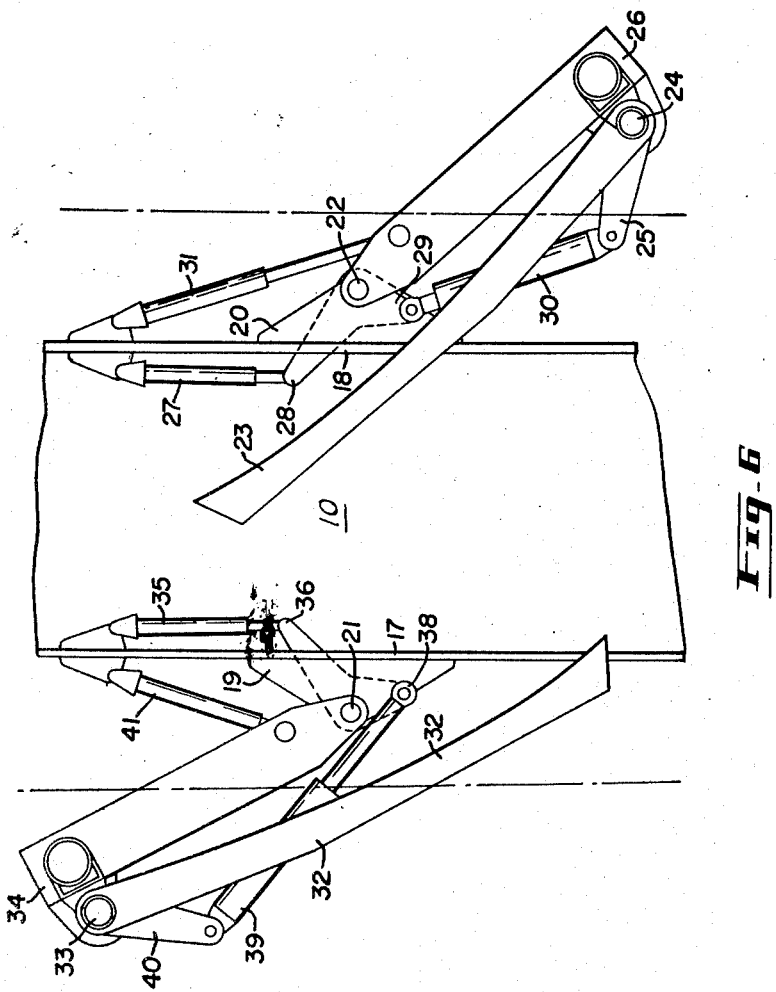

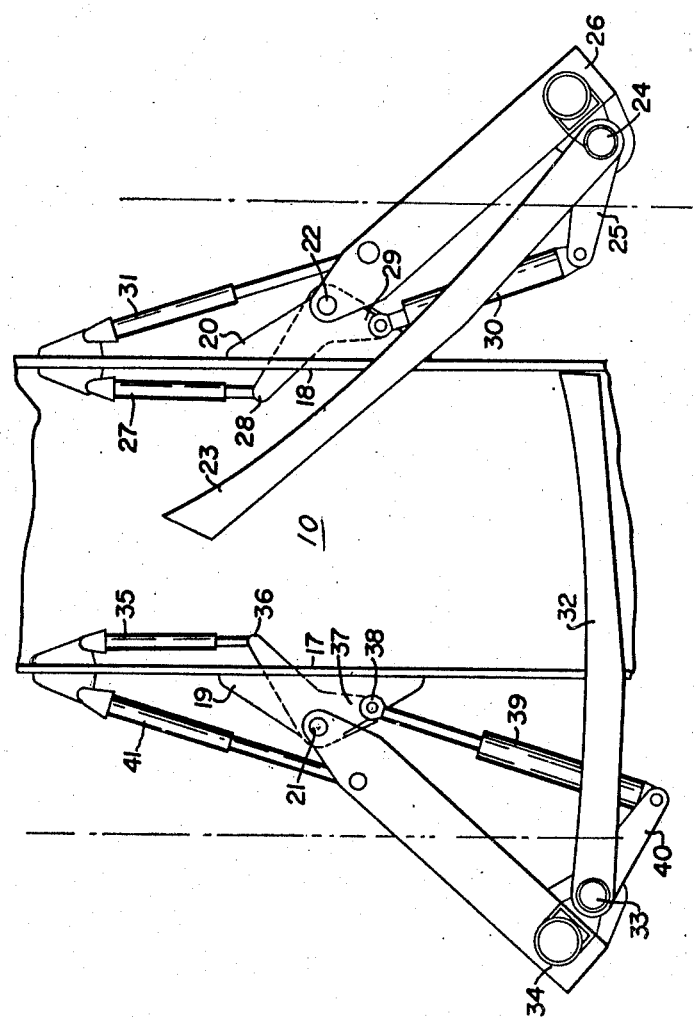

June 15, 1965  R. G. DAY  3,189,201
BAFFLE STRUCTURE

Filed June 17, 1963  10 Sheets-Sheet 8

INVENTOR
ROBERT GEORGE DAY
By Cushman, Darby & Cushman
ATTORNEYS

United States Patent Office 3,189,201
Patented June 15, 1965

3,189,201
BAFFLE STRUCTURE
Robert G. Day, Port Arthur, Ontario, Canada, assignor to Seabar Equipment Ltd., Fort William, Ontario, Canada
Filed June 17, 1963, Ser. No. 288,078
Claims priority, application Canada, July 25, 1962, 854,532
3 Claims. (Cl. 214—47)

The present invention relates to a baffle system for use in guiding a free flowing bulk commodity such as grain, fertilizers, bulk ores, chemicals, or pellets carried in freight cars through the side doors thereof when the contents of a car are being removed by an end tilt dumper; and to a method of dumping such contents from freight cars. The invention has special significance in the art of grain handling, and will be described in relation thereto.

Several attempts have been made in the past to provide baffles for use with end tilt dumpers which would serve the function of assuring that all the grain stored in a freight or box car would be directed through the side doors of the car as the car was tilted from end to end. These baffle systems in practice have not proven to be completely effective since it has been impossible successfully to empty all the grain from a freight car by tilting the car once only on each end. With the baffle system of the present invention, for the first time the grain may be completely removed from a freight car by tilting each end of the car only once without any side tilting of the car. This improved baffle structure has greatly increased the efficiency of end tilt grain dumpers and has increased the speed at which freight cars may be emptied using such an end tilt dumper. It will be appreciated that if the number of cars emptied on an end-tilt dumper can be increased from 6 to 14 cars per hour that a major improvement in the operation in dumping freight cars has been achieved. With the baffle structure of the present invention it is now possible to empty a freight car using only two end tilts, and no side tilt, without the necessity of hand sweeping or shovelling.

The baffle system constructed in accordance with the present invention is inserted downhill into the grain near the end of the first uptilt and serves to deflect the grain from the car during the second uptilt. The applicants have discovered that when a freight car full of grain is tilted endwise, the grain in the low end of the car serves as an obstacle to the flow of the grain in the high end of the car and automatically causes the grain in the high end of the car to flow out through the side doors of the car. Thus it is only necessary to use baffles to remove any grain left between the doors at the end of the first tilt and direct the flow of grain during the second tilt of the grain dumper. In accordance with the present invention, these baffles are inserted downhill into the grain in the lower end of the car, near the end of the first uptilt, thereby sweeping ahead of them any grain lying between the doors, and the baffles subsequently serve to deflect the grain from this end of the car through the side doors during the second uptilt of the grain dumper.

In accordance with the present invention, a baffle structure for use in an end tilt grain dumper comprises a pair of baffles adapted to be inserted through the side doors of a freight car and to form a V-shaped baffle assembly to cause the grain from one end of the car to flow outwardly through the side doors of the car. These baffles are provided with insertion means adapted to ensure that the baffles engage the floor of the car and adapted to cause the baffles to enter the car consecutively and in such a way that each baffle in turn sweeps the grain toward the low end of the car, as it is inserted. Thus all the grain in the car is below the baffles when these baffles are inserted into the car at the end of the first tilt.

In drawings which illustrate embodiments of the invention:

FIG. 2 is a section through the grain dumper of FIG. 1 illustrating the baffle structure in the fully retracted position.

FIG. 3 is a view similar to FIG. 2 showing the right hand baffles at the end of the first stage of insertion.

FIG. 4 shows the right hand baffle at the beginning of the second stage of insertion.

FIG. 5 shows the right hand baffle at the end of the second stage of insertion.

FIG. 6 shows the right hand baffle fully inserted and the left hand baffle at the end of the first stage of insertion.

FIG. 7 shows the left hand baffle at the end of the second stage of insertion.

Figure 1:
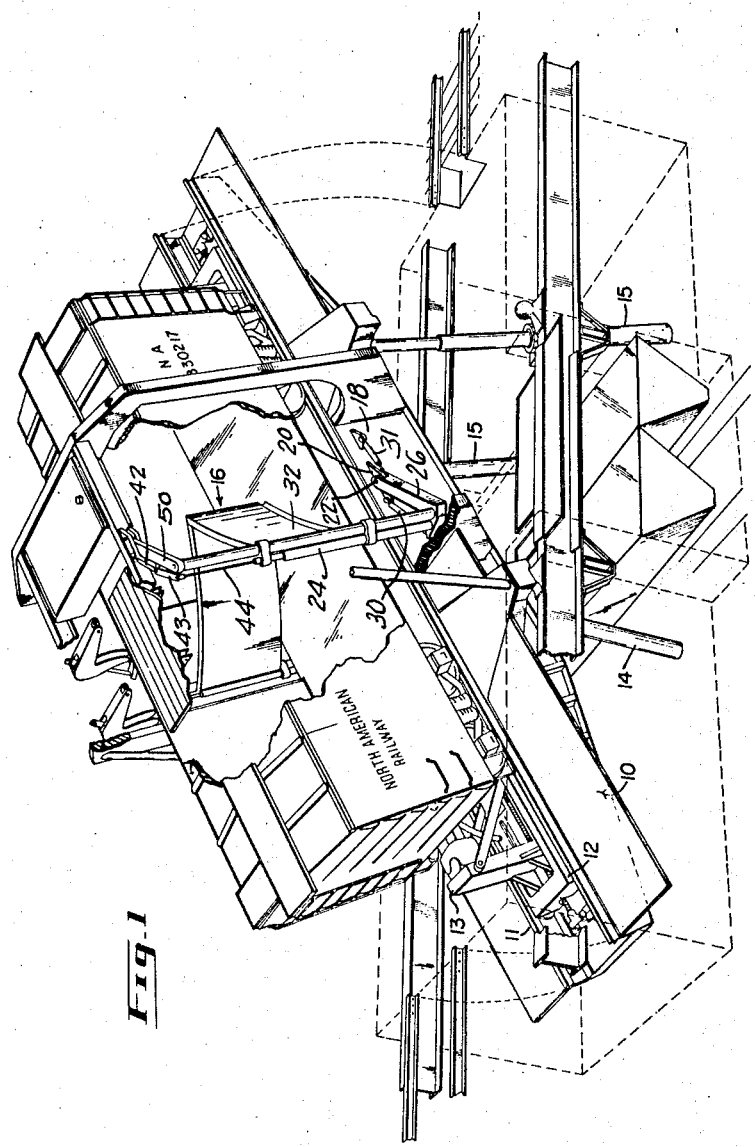
FIG. 1 is a perspective view, partly broken away, showing an end tilt grain dumper using baffles constructed in accordance with the present invention, the grain dumper being shown at the end of the second tilt when all the grain has been emptied from the car.

In FIG. 1 a typical end tilt grain dumper is shown on which a freight car having side door openings is mounted and from which the grain has been removed by tilting the car first on one end and then the other. It will be appreciated that the car is not tilted through a full 90° but is tilted to an angle greater than the angle of repose of the grain, so that all of the grain will be emptied from an end of the car as the car is tilted. In FIG. 1 the dumper is shown at the end of the second uptilt when all the grain has been removed from the car. This dumper consists of a cradle 10 carrying a pair of tracks 11 and 12 on which the freight car rolls. The car is clamped in position on the cradle 10 by means of the car clamps 13, the left hand clamp only can be seen. These car clamps engage the couplers on the ends of the freight cars and hold it rigidly in position on the cradle during the dumping operation. The dumper cradle 10 is tilted by means of hydraulic cylinders 14 and 15 which are extended alternately to raise the opposite ends of the grain dumper. The grain dumper is also provided with a door opening mechanism (not shown) which serves to "uncooper" the grain doors fitted inside the normal freight car doors.

In accordance with the present invention the grain dumper is also provided with a novel pair of grain baffles which are inserted into the freight car and serve to deflect the grain outwardly through the side doors during the second tilt of the grain dumper. As shown in FIG. 1 these baffles, indicated generally at 16, form a V-shaped deflector or plow which tends to force the grain in the car to flow out through the side doors during the second tilt of the dumper.

Figure 10:
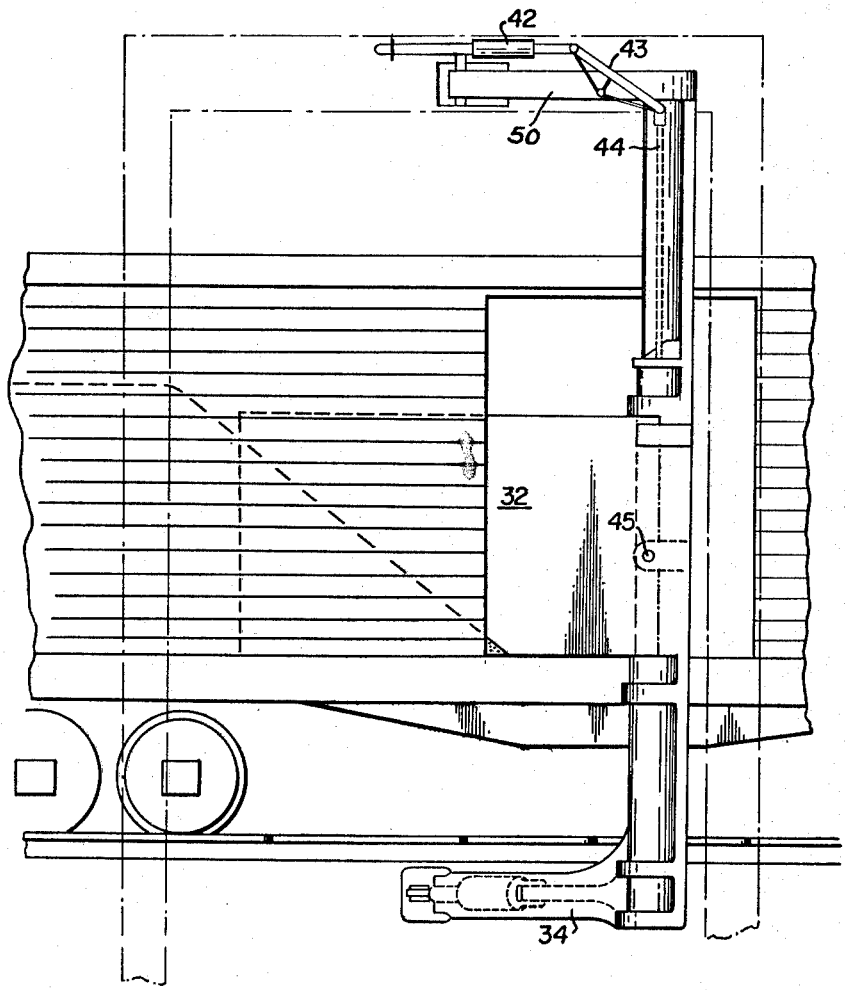
FIG. 10 is a view on the line 10—10 of FIG. 8 showing the baffles fully inserted through the door of the car at the end of the first tilt.

FIG. 2 is a section through the baffle mechanism of the present invention, showing the baffles fully retracted. Beams 17 and 18 form the two side members of the cradle structure 10, illustrated generally in FIG. 1. The car baffles are mounted from the beams 17 and 18 as described hereinafter. Plates 19 and 20 are fixed to the beams 17 and 18 and serve to support the main pivots 21 and 22 of the grain baffle structure (FIG. 2). Insertion means comprising a plurality of hydraulic cylinders and lever mechanisms is provided for positioning the baffles within the car. The right hand baffle 23 which is first inserted in the car is secured to mounting means comprising a vertically extending post 24 which in turn is rigidly connected to a lever 25 and pivoted on the outer end of a beam 26 of a first or lower pair thereof. As shown in FIGURE 10, each baffle is mounted from a pin 45 on the vertically extending post, to permit tilting of the baffle to accommodate cars having sloping floors due to damaged springs. The beam 26 (FIG. 2) is mounted for rotation about the pivot 22 as shown. A first hydraulic cylinder 27 has one end fastened to the beam 18 and the other end pivoted to a crank 28 which is mounted for rotation about the pivot 22. The free end 29 of the crank 28 is connected to a second hydraulic cylinder 30. A third hydraulic cylinder 31 is connected between the beam 18 and the beam 26.

Similarly, the left hand baffle 32 is mounted from a post 33 which is pivoted on a beam 34, of the first or lower pair thereof, which is adapted for rotation about the pivot 21. A hydraulic cylinder 35 is pivoted to the end 36 of a bell crank 37. The free end 38 of the bell crank 37 is connected to a hydraulic cylinder 39, the opposite end of which is connected to a lever 40 which is rigidly fixed to the baffle 32 and the post 33. A further hydraulic cylinder 41 is connected from the beam 17 to the beam 34.

During insertion of the baffles into the freight car, different motions of the baffles are required. Firstly, it is necessary that the baffle be adjustable in height to conform to the height of the floor of the freight car. Secondly, the baffles must be inserted laterally into the car in such a way that grain in the area where the baffles will be positioned is swept ahead of the baffles, downhill into the low end of the car in preparation for the second tilt.

FIGS. 3 to 8 inclusive illustrate different stages in insertion of the baffles into the car. In FIG. 3 the first stage of baffle motion is shown for the right hand baffle, this baffle enters the car first, followed by the left hand baffle after the right hand baffle has reached its final position. It will be noted that during the insertion of the baffles, that they both sweep in an arcuate path the area in which any grain may be resting in the center of the car, thus ensuring that all the grain is moved ahead of the baffles as they are positioned in the car. As shown in FIG. 3, as the hydraulic cylinder 27 is retracted, the crank 28 is rotated about the pivot 22, causing the right hand baffle 23 to move toward and into the doorway of the grain car, the outer limit of the grain car being shown by the broken line parallel to the beam 18. In FIG. 4 the second stage of the baffle motion is shown with the baffle inserted further into the car. In this stage the hydraulic cylinder 31 is extended and causes the beam 26 to rotate about the pivot 22 and the baffle 23 is now further inserted into the car. In FIG. 5, the baffle 23 is at the end of the second stage of the insertion and the hydraulic cylinder 31 is fully extended. It will also be noted that the hydraulic cylinder 30 is still fully extended, as the third stage of insertion has not started. As shown in FIG. 6 the right hand baffle 23 is in its final position at the end of the third stage of insertion. The hydraulic cylinder 31 having been fully extended and the hydraulic cylinders 30 and 27 fully retracted.

Figure 8:
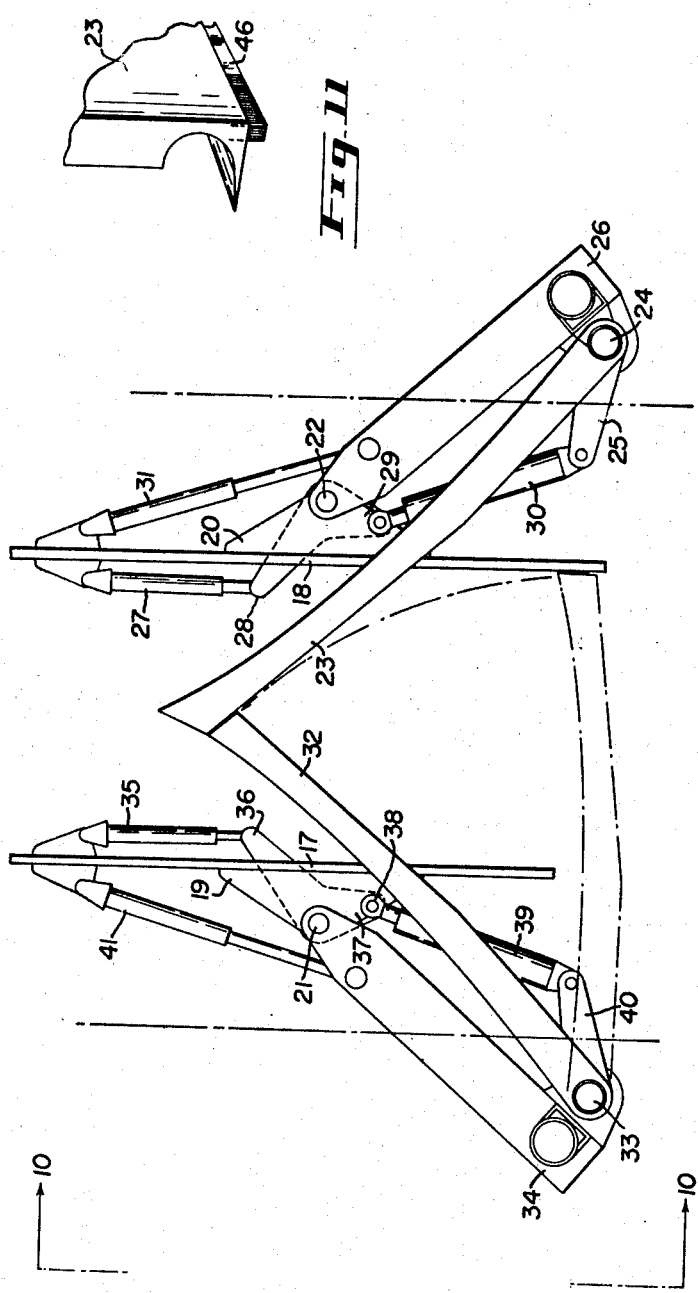
FIG. 8 shows the two baffles fully inserted.

As shown in FIG. 6, the left hand baffle 32 is at the end of the first stage of insertion and the hydraulic cylinder 35 is fully retracted. In FIG. 7 the left hand baffle 32 is shown at the end of the second stage of insertion with the hydraulic cylinder 41 fully extended; the hydraulic cylinder 39 is still fully extended. In FIG. 8 the two baffles are fully inserted with the hydraulic clinders 27 and 35 fully retracted, the hydraulic cylinders 31 and 41 fully extended and the hydraulic cylinders 30 and 39 fully retracted.

Figure 9:
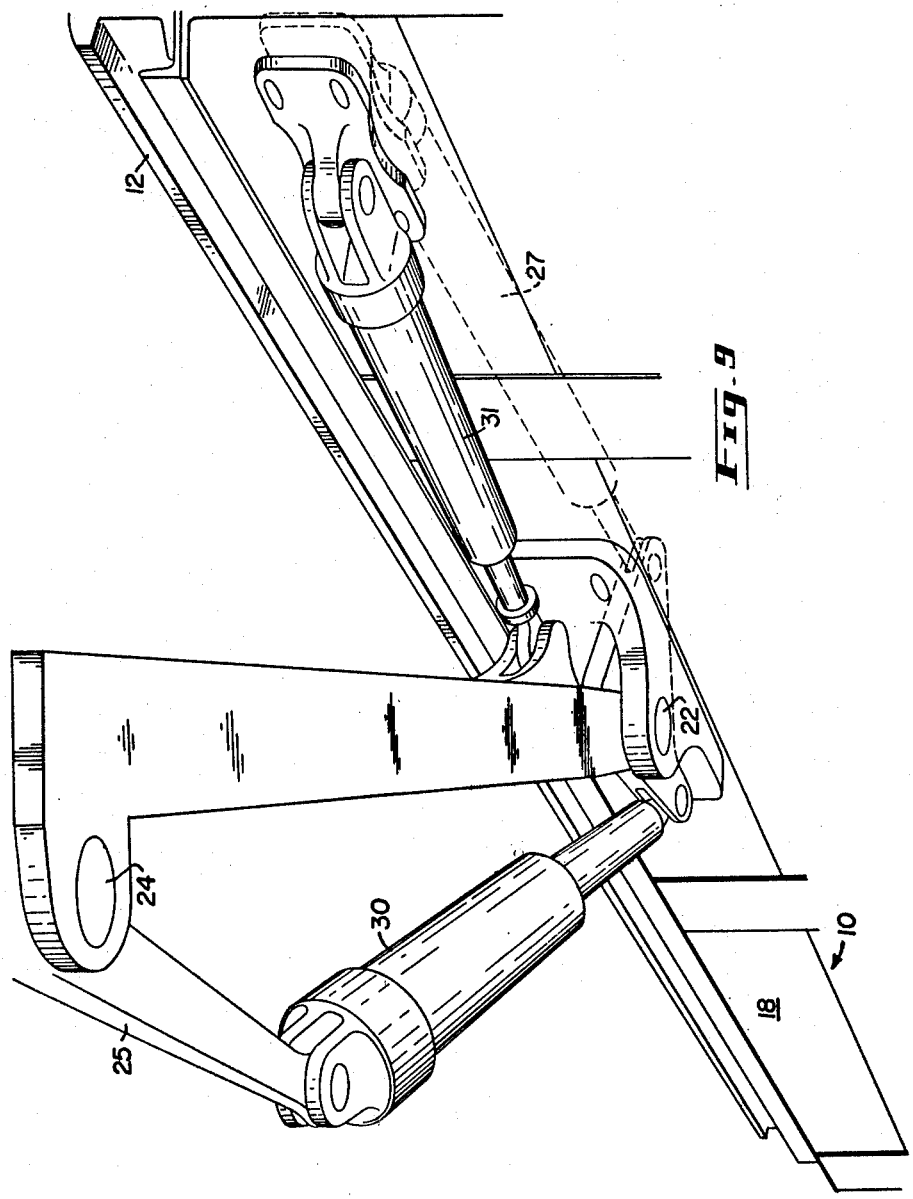
FIG. 9 is a perspective from below the level of the cradle showing the hydraulic cylinders used for inserting the baffles in the car.

FIG. 9 is a perspective view from below and to the side of the cradle 10 showing the beam 18 and the hydraulic cylinders 27, 30 and 31 and the way in which each of these hydraulic cylinders is mounted on the grain dumper.

As shown in FIG. 10 a linkage consisting of an arm containing an elastic element 42 pivoted from the arch structure of the dumper, a crank 43, and lift rod 44 is provided to raise and lower the baffle 32. The upper end of the post is connected to an upper beam member 50 of a second pair thereof. During the second stage of insertion of the baffle 32, the lower beam 34 rotates about the main pivot 21. Since the point of attachment of the arm 42 is eccentric with the pivot 21, the crank 43 will also rotate causing the lift rod 44 to lower the baffle until it contacts the floor of the car. The baffle 32 being pivoted on the pin 45 can conform to the sloping floor of any cars which may have defective springs. Further motion of the crank 43 cannot take place once the baffle is firmly seated on the floor of the car, so the elastic arm 42 will be compressed during further movement of the beam 34.

Figure 11:
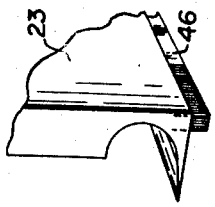
FIG. 11 is a fragmentary perspective view of the lower outer edge of a baffle.

FIG. 11 shows in perspective the structure of the lower edge of the baffle 23. It will be noted that an inwardly curved cross section is used at the lower edge of the baffle, since improved flow of the grain appears to result. A brush 46 is also fitted to the lower edge of the baffle 23 to improve the sweeping of grain lying in the path of the baffles during insertion.

It will be appreciated that where a feature has been described in relation to one of the two baffles that the other baffle also has this feature, thus a device identical to the devices shown in FIGURES 10 and 11 is provided for each baffle.

Several important features of the baffle structure in accordance with the present invention may be observed from the drawings of this application. Firstly, the baffles in the fully retracted position are well separated from the sides of the freight car and permit the clear passage of the grain car onto and off the cradle 10. Further since theer is a good deal of clearance between the retracted baffles and the side of the car, anyone riding on the ladder on the side of the freight car would not be struck by the baffles as the car is passed through the grain dumper. This is an important safety feature and is only provided by the baffles in accordance with the present invention. tI will also be noted that the baffles of the present invention, during insertion in the car are rotated through an angle considerably more than 90° and accordingly, effectively sweep the grain from the high end of the car if any grain is left at the end of the first tilt across door openings to the low end of the car, thus completely cleaning the car. For the first time grain may be emptied from freight cars in an end tilt dumper using only one tilt of each end of the car and without the use of vibrators, side tilt or other devices which are objectionable from the point of view of the railway company owning the cars.

It will also be noticed that the baffles constructed in accordance with the invention are hydraulically operated and accordingly can readily be connected to a source of hydraulic pressure and remotely operated without costly mechanical connections to motors and the like. Also if for any reason, an obstruction is present in the path of the baffles the hydraulic system will tend to prevent any sudden jarring of the baffles which would tend to cause accidental breakage of the freight cars or of the baffles themselves. It will be appreciated that the structure as disclosed in this application can be altered while employing the same principles of operation as are embodied in the present invention. It will be appreciated that the principle underlying the present invention is that the two baffles are swept downhill into the grain at the low end of the car, in succession, thus ensuring that all the grain is moved ahead of the baffles so that when the car is tilted for the second time all of the grain will be emptied from the car.

I claim:

1. A grain deflecting structure for end tilt grain car dumpers, said structure including a pair of baffles adapted for insertion into a car on said dumper to deflect substance out of the car when tilted by said dumper; means mounting said baffles above said dumper adjacent the doorways of said car; and insertion means mounted on said dumper for each baffle and being operatively connected to said mounting means adapted to actuate said baffles to a first or inoperative position where said baffles are juxtaposed in relation to the sides of said car and to a second or deflecting position where said baffles sequentially are inserted laterally into said car along the floor thereof to form a plow; said mounting means including an eccentric connection with said insertion means whereby the lateral insertion of each said baffle terminates in an arcuate sweeping path within the confines of said car thereby displacing substance in the centre of the car towards one end thereof.

2. In combination with a grain car dumper, a grain deflecting structure comprising
 (a) a first pair of beam members pivotally connected to said dumper on opposite sides thereof and projecting laterally therefrom;
 (b) a second pair of beam members pivotally connected to said dumper on opposite sides thereof and spaced upwardly from said first pair;
 (c) a vertical post connected at its ends to a first and second beam member of each pair thereof;
 (d) a baffle mounted on each post;
 (e) hydraulic means on said dumper operatively connected to said first pair of beam members adapted, when actuated, to swing said beam members sequentially on their pivotal connections so as to laterally insert said baffles into the doors of a car held on said dumper and along the floor of said car in arcuate paths whereby said baffles form a plow in said car; and
 (f) means associated with said second pair of beam members for raising or lowering said baffles on the posts.

3. A method of dumping a free flowing substance from a grain car mounted on an end tilt dumper which comprises the steps of raising a first end of said car whereby said substance will flow to the second or low end; sequentially inserting baffles laterally into said car through the doors thereof in arcuate sweeping paths within the confines of the car to form a plow therein and to sweep substance remaining in the centre of said car to the second or low end thereof; lowering said first end and subsequently raising said second end whereby said substance will flow from said second end along the baffles and outwardly of the car.

References Cited by the Examiner
UNITED STATES PATENTS

| | | | |
|---|---|---|---|
| 814,610 | 3/06 | Lefferts | 214—47 |
| 1,865,633 | 7/32 | Kidder | 214—47 |
| 2,797,000 | 6/57 | Winter | 214—47 |

HUGO O. SCHULZ, *Primary Examiner.*
GERALD M. FORLENZA, *Examiner.*